(12) United States Patent
Piazza

(10) Patent No.: US 6,762,691 B2
(45) Date of Patent: Jul. 13, 2004

(54) METHOD AND SYSTEM FOR AUTOMATICALLY LOCATING EQUIPMENT STORED IN A RACK

(75) Inventor: William J. Piazza, Holly Springs, NC (US)

(73) Assignee: International Business Machines Corporation, Armonk, NY (US)

(*) Notice: Subject to any disclaimer, the term of this patent is extended or adjusted under 35 U.S.C. 154(b) by 571 days.

(21) Appl. No.: 09/758,021

(22) Filed: Jan. 10, 2001

(65) Prior Publication Data
US 2002/0091463 A1 Jul. 11, 2002

(51) Int. Cl.[7] .............................................. G06F 7/00
(52) U.S. Cl. ............................. 340/825.49; 340/568.1; 700/213
(58) Field of Search ........................ 340/825.49, 10.1, 340/10.31, 572.1, 568.1; 235/385; 711/115; 700/213, 229

(56) References Cited

U.S. PATENT DOCUMENTS

| | | | |
|---|---|---|---|
| 4,814,742 A | * 3/1989 | Morita et al. ............. 340/10.31 |
| 5,063,380 A | * 11/1991 | Wakura .................. 340/825.49 |
| 5,455,409 A | * 10/1995 | Smith et al. ................. 235/385 |
| 5,664,146 A | * 9/1997 | Bolin et al. .................. 711/115 |
| 5,689,238 A | * 11/1997 | Cannon et al. ........... 340/572.1 |
| 5,814,171 A | 9/1998 | Manes et al. .................. 156/64 |
| 5,900,007 A | 5/1999 | Nunnelley et al. .............. 711/4 |
| 5,967,339 A | 10/1999 | Utsumi et al. ............ 211/41.12 |
| 6,098,050 A | 8/2000 | Knoblock ..................... 705/28 |

FOREIGN PATENT DOCUMENTS

| | | | |
|---|---|---|---|
| JP | 60080163 | 5/1985 | ........... G11B/17/22 |
| JP | 63214977 | 9/1988 | ......... G11B/23/023 |
| JP | 1078463 | 3/1989 | ........... G11B/17/22 |
| JP | 8087811 | 4/1996 | ........... G11B/17/26 |
| JP | 8157009 | 6/1996 | ............. B65G/1/00 |

* cited by examiner

Primary Examiner—Edwin C. Hollowway, III
(74) Attorney, Agent, or Firm—Sawyer Law Group (57) ABSTRACT

A method and system for automatically determining the location of equipment mounted in a rack is disclosed. The method and system comprises providing a plurality of signal emitting elements within the rack and transmitting positional information from the rack to the equipment via at least one signal emitting element of the plurality of signal emitting elements. The equipment receives the positional information transmitted by the at least one signal emitting element, and is capable of reporting the positional information, such that the location of the equipment can be determined.

33 Claims, 6 Drawing Sheets

METHOD AND SYSTEM FOR AUTOMATICALLY LOCATING EQUIPMENT STORED IN A RACK

FIELD OF THE INVENTION

The present invention relates to equipment management and more particularly to locating automatically equipment stored in an equipment rack.

BACKGROUND OF THE INVENTION

In many companies, it is common to store equipment in racks, which typically house several components on different shelves therein. By storing components in racks, a company can organize and optimize space utilization. The optimization and organization of space can be very important if the equipment must be stored under particular environmental conditions, such as low humidity and/or low temperature conditions. Under those conditions, a special room is usually dedicated to housing such environmentally sensitive equipment. In any event, it is not uncommon to have a room filled with multiple racks, each storing several pieces of equipment.

Keeping track of the location of each component can be a daunting, but necessary, task. If the company desires to reconfigure its network, or if a particular component, such as a server, sends out an alert that a hardware component is about to fail, a system administrator must be able to locate the components quickly. System management software is available to help the system administrator monitor computer components such as servers, storage devices, and network routers, and to warn the system administrator if and when intervention is required for a particular component. For example, intervention would be necessary for environmental concerns (such as elevated temperatures in a portion of the equipment), hardware failures, and performance issues. System alerts can also include warnings of potential problems so that the system administrator can take preventive measures to avoid a catastrophic failure.

Typical system management software applications include a system management console program and a system management agent. The console program typically resides on the system administrator's workstation, and the management agent resides on the managed components. The system administrator is able to monitor each component through the cooperation between the console program and the management agent. Management software applications include IBM Netfinity Manager, IBM Netfinity Director, Tivoli TME 10, and Compaq Insight Manager, to name a few. The utility of such programs is clear, yet, those advantages can be seriously limited if the system administrator cannot identify the physical location of a component, particularly if the component is one of several hundred, or mounted in a rack that is in a room with dozens of other racks.

One method of locating or tracking the physical location of a piece of equipment involves manually attaching a label, such as a bar code sticker, to each rack and/or component and scanning the bar code number with a reading device. This method, however, requires either a person operating the reading device to scan each component, or having the component moved past a stationary scanner. Both can be time consuming, inefficient, and costly. To allow system management software to be aware of the physical location of the component, the user typically performs the burdensome task of entering manually the identity and location of the component into the system. As components are added, relocated, removed, or replaced, the physical scanning or data entry methods can easily miss or misidentify components. Thus, accuracy is questionable.

Another method of tracking the physical location of a component involves embedding an electrical memory device in the component and providing a physical connection, mechanical or electrical, between the enclosure and the component. When the component is placed in the enclosure, a system, which communicates with the enclosure, reads and stores the memory information of the component. The system then allows the user to enter search terms and the system illuminates an indicator light near the component, which matches the user's search criteria.

This method has several drawbacks, one of which is that the physical connection between the enclosure and the component, such as a cable or connector, can become a source of failure, requiring human intervention and maintenance. Thus, reliability is an issue. Moreover, the connection between the system and the enclosure must support the protocol needed to read the memory and control the light. For example, an interconnection between a server and an enclosure housing disk drives might support the protocols needed to pass information to and from the disks, but might not support commands or signals needed to illuminate and extinguish the light.

Accordingly, a need exists for a system and method for locating rack-mounted equipment. The system and method should be automatic, i.e., requiring little or no human intervention, and highly reliable requiring little or no maintenance. In addition, the system and method should be cost effective. The present invention addresses such a need.

SUMMARY OF THE INVENTION

A method and system for automatically determining the location of equipment mounted in a rack is disclosed. The method and system comprises providing a plurality of signal emitting elements within the rack and transmitting positional information from the rack to the equipment via at least one signal emitting element of the plurality of signal emitting elements. The equipment receives the positional information transmitted by the at least one signal emitting element, and is capable of reporting the positional information, such that the location of the equipment can be determined.

Through the aspects of the present invention, the location of a piece of equipment mounted in a rack is automatically provided to the component itself. This positional data can then be reported automatically to a system management software application utilized by the system administrator.

DETAILED DESCRIPTION

The present invention relates to equipment management and more particularly to automatically locating equipment stored in an equipment rack. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
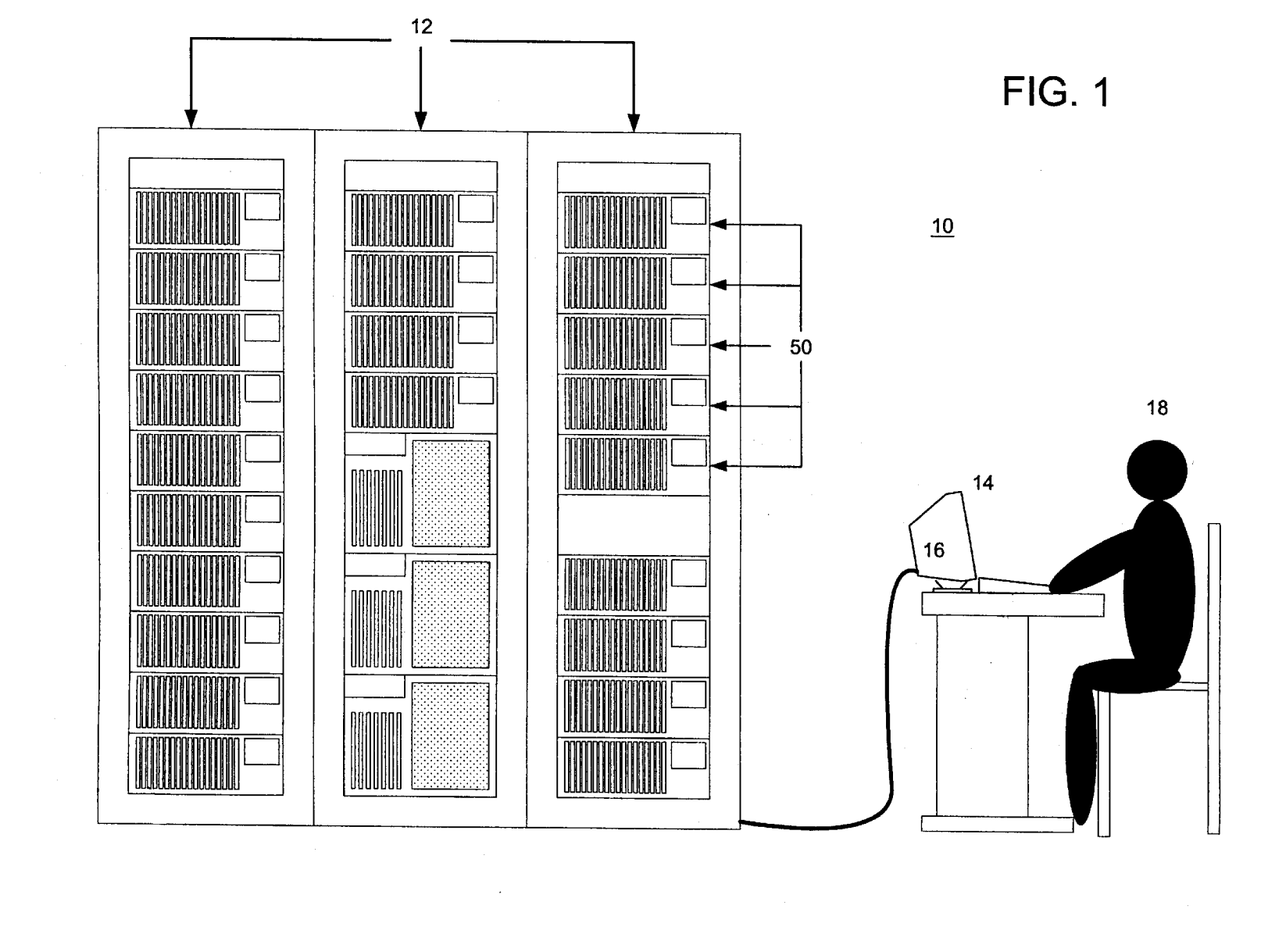
FIG. 1 illustrates a block diagram of the system in accordance with a preferred embodiment of the present invention.

In accordance with the present invention, a rack-mounted component locating system allows each component to self identify the rack in which it rests and the vertical position within that rack. The component can communicate this information to a system administrator via a system management software application. A block diagram of the system in accordance with the present invention is illustrated in FIG. 1. As shown, the system 10 includes a plurality of equipment racks ("racks") 12, a plurality of components 50 within each rack 12, and a system administrator 18. The system administrator 18 monitors the components 50 via a personal computer or workstation 14 which is network connected to the components 50. The system management console program ("hereinafter referred to generally as system management software) 16, which preferably resides in the workstation 14, communicates with the components 50 through the system management agent (not shown) residing on each component 50. If certain conditions are detected in a component 50, the system management software 16 will issue an appropriate message to the system administrator 18. According to the present invention, that message will include information enabling the system administrator 18 to determine the physical location of the component 50 that is the subject of the message. In one embodiment, the system management software 16 is capable of presenting a graphical representation of the physical location of the component to the system administrator.

Figure 2:
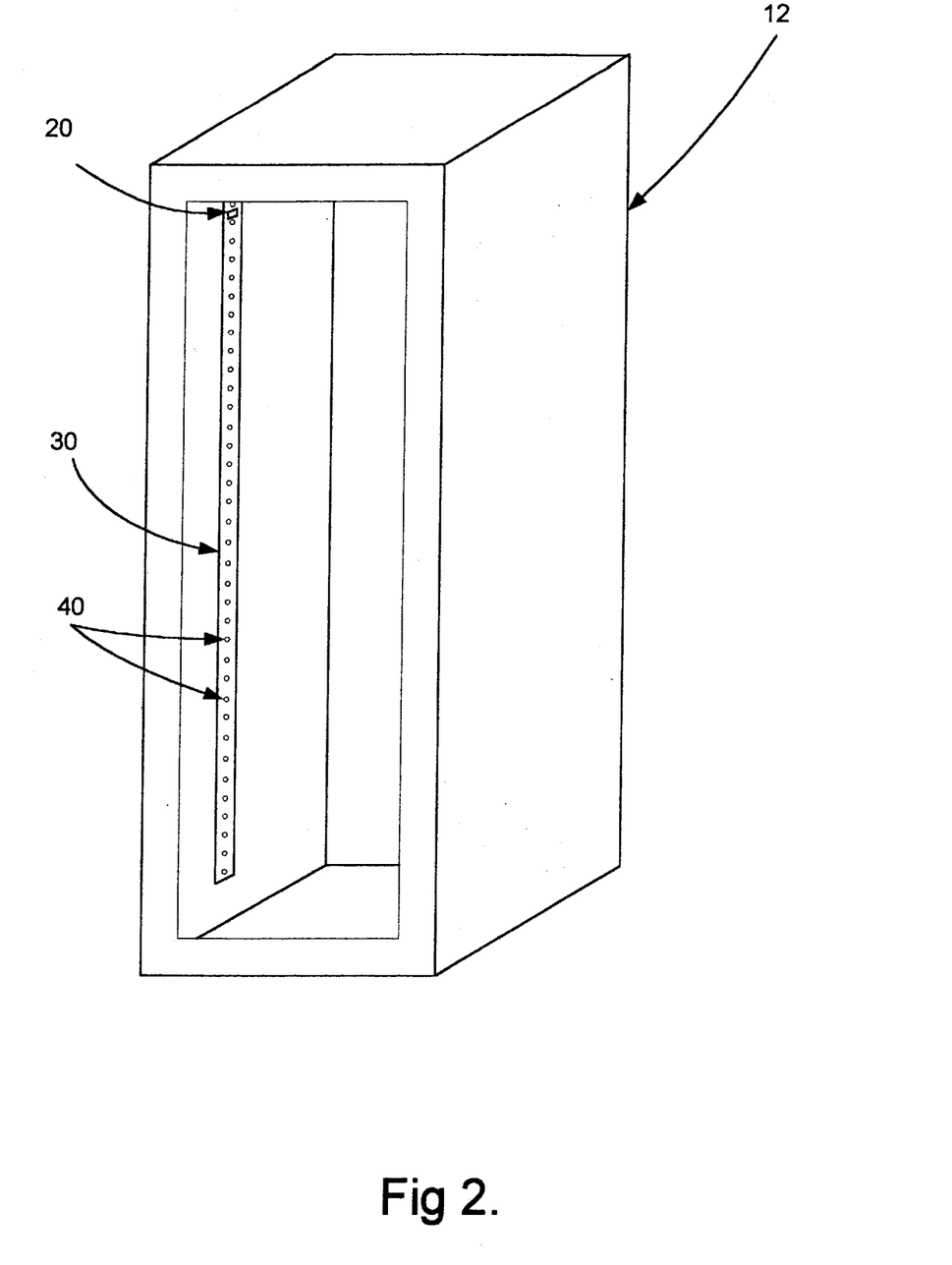
FIG. 2 illustrates a block diagram of an equipment rack in accordance with the present invention.

FIG. 2 illustrates a rack 12 for automatically locating rack-mounted equipment in accordance with the present invention. The rack 12 includes an open face for receiving shelves and equipment (not shown). In one embodiment, a light emitting diode ("LED") strip 30 containing a plurality of LEDs 40 is preferably vertically mounted on an interior side wall of the rack 12. In this embodiment, the LED strip 30 extends from the top of the rack 12 to its bottom. Each of the LEDs 40 are preferably evenly spaced throughout the LED strip 30. Although the system 10 preferably uses LEDs 40, those skilled in the art will appreciate that different signal emitting devices could be used, and that such use would fall within the scope and spirit of the present invention.

Referring again to FIG. 2, in a preferred embodiment, a single chip microcontroller 20 is mounted onto the LED strip 30 and drives the LEDs 40. The microcontroller 20 can be powered by, for example, a low cost AC adapter (not shown) similar to that utilized in hand held devices, such as calculators.

Figure 3:
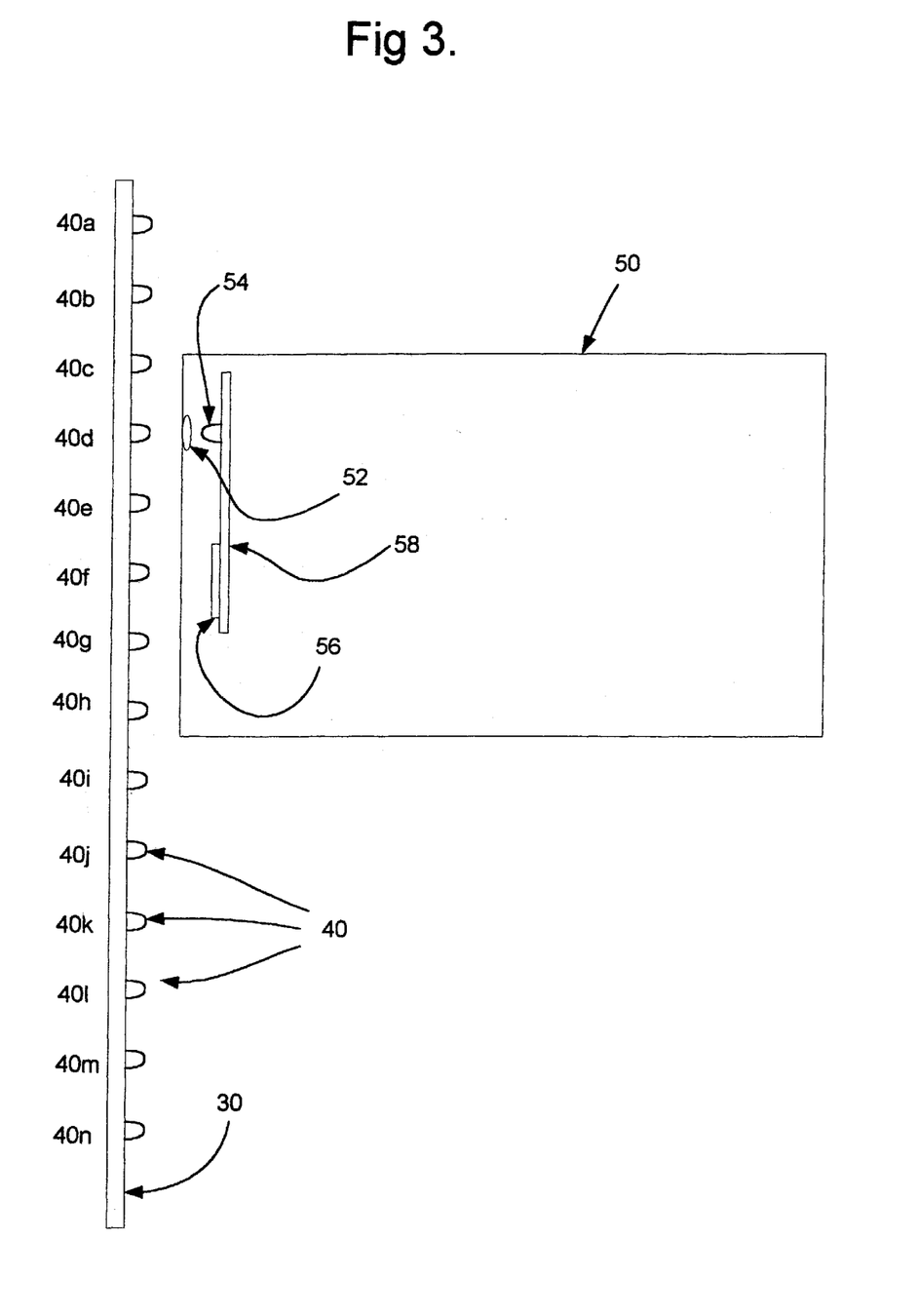
FIG. 3 illustrates a block diagram illustrating an example of the alignment of the signal emitting elements to the rack-mounted component and the detector therein.

FIG. 3 provides a frontal view of one rack-mounted component 50 and its relative position to the LEDs 40a–40n in the rack 12. Although one component 50 is illustrated in FIG. 3, in a typical configuration, a plurality of components 50 would be stored within a rack 12. Referring again to FIG. 3, the component 50 sits on a shelf (not shown) inside the rack 12. A detector 54 is provided inside the component 50 for sensing a signal transmitted by at least one LED 40a–40n. In a preferred embodiment, the detector 54 is an infrared phototransistor that is mounted on a circuit board 58 in the component 50 in a location that faces the LED strip 30. An opening 52 on the side of the component provides a window through which the detector 54 can "see" one or more LEDs 40. An intelligent component 56, such as a service processor, is provided in the equipment 50 to read a signal from the detector 54. The intelligent component 56 communicates with a system management agent (not shown), which in turn is in communication with a system management software application 16 (not shown) that is utilized by the system administrator 18 (not shown).

In operation, the present invention can be described using two processes. In the first, the microcontroller 20 directs each LED 40 to transmit a signal containing rack identification and positional information, one LED 40 at a time in sequential order, starting with a first LED 40. When the last LED 40 has transmitted, the process begins again with the microcontroller 20 directing the first LED 40 to transmit. While the first process focuses on the microcontroller 20 and the LEDs 40, the second process is centered on the component 50 in the rack 12. In the second process, the component 50 senses the signal from at least one LED 40 and updates, if necessary, the positional information conveyed in the signal. This process repeats, whereby the component 50 is always aware of its positional information. The component 50 has the ability to provide this information to the system management agent, and in turn to the system management software application 16, thereby informing the system administrator 18 to its physical location. Both processes will be discussed in detail below.

Figure 4:
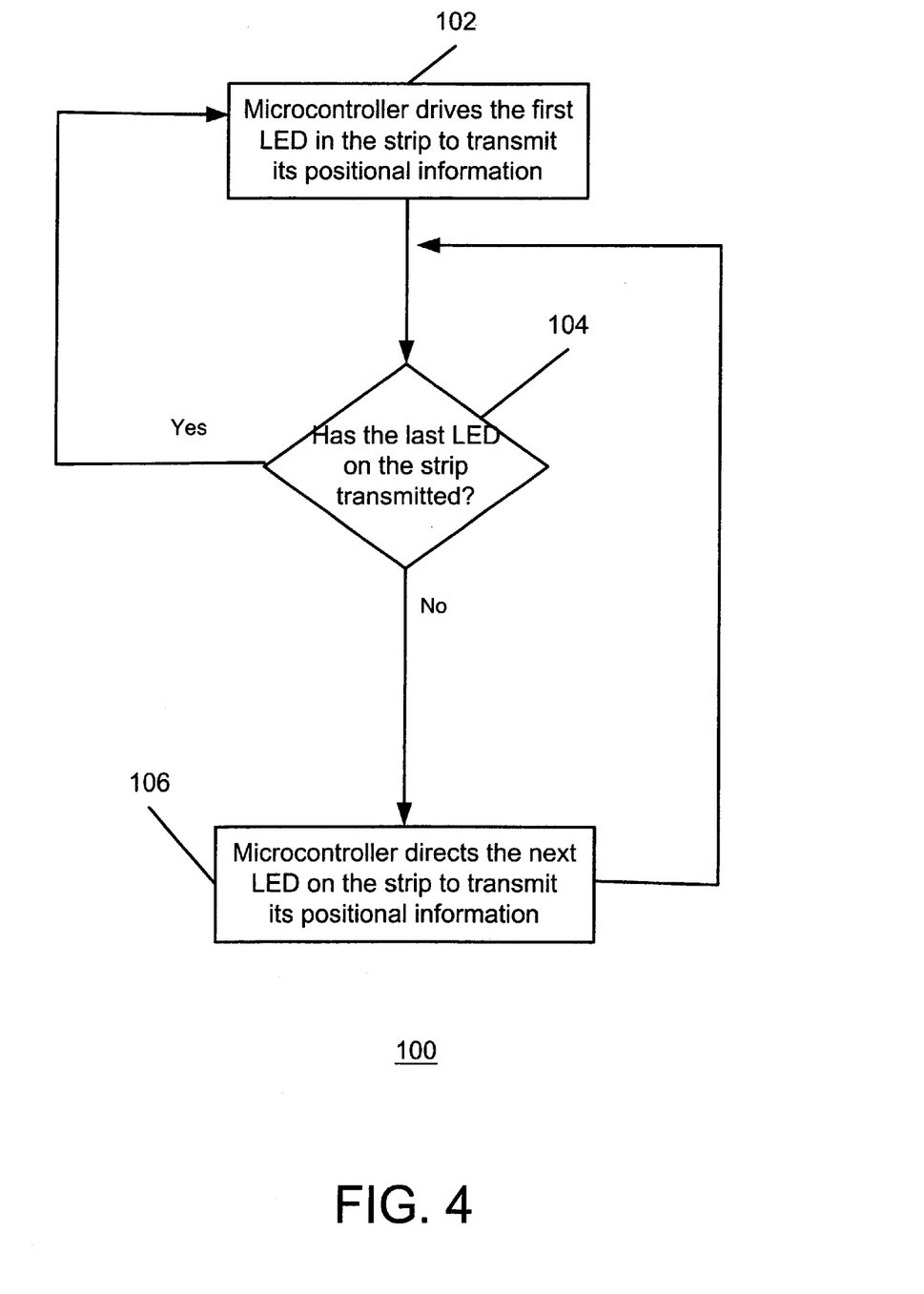
FIG. 4 is a flow chart illustrating the process of automatically transmitting positional information from the rack in accordance with the present invention.

FIG. 4 illustrates the first process 100 of automatically transmitting positional information from the rack 12 in accordance with an embodiment of the present invention. Starting with the first, and in this embodiment, topmost LED 40a in the strip 30 (FIG. 3), the microcontroller 20 drives the first LED 40a to transmit a signal containing positional information in step 102 For example, the microcontroller directs the LED 40 to turn off and on, i.e. blink, in a pattern which would convey data (and possibly timing information). This pattern can be in bits representing the ASCII value of each character in the message serially. Naturally, those skilled in the art appreciate that other ways of encoding a message on an optical signal exist, and the scope of the present invention is in no way limited to the described form.

Referring again to FIG. 4, after the first LED 40a transmits its signal in step 102, it is determined whether that LED 40a is the last LED 40n in the strip 30, via step 104. If the LED 40a is not the last LED 40n, then the microcontroller 20 directs the next LED 40b in the strip to transmit positional information in step 106. The process returns to step 104 to determine whether the last LED 40 to transmit is the last LED 40 in the strip 30. If not, the process repeats until the last LED 40n has transmitted its signal and step 104 is answered affirmatively. Thereafter, the process loops back to step 102, wherein the microcontroller 20 drives the first LED 40a to transmit its signal, and the process continues indefinitely.

Figure 5:
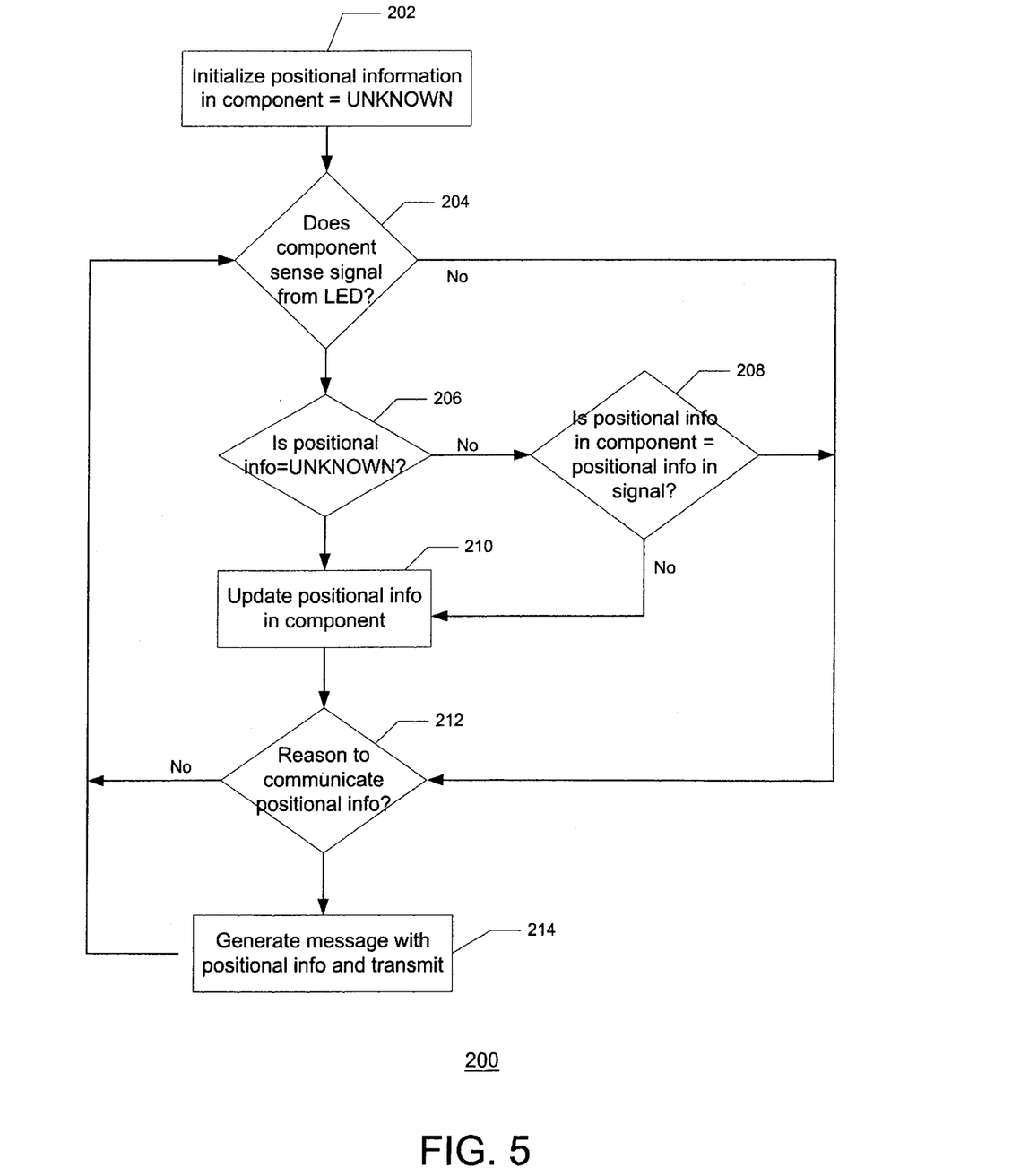
FIG. 5 is a flow chart illustrating the process of automatically receiving positional information in the component from the rack in accordance with an embodiment of the present invention.

FIG. 5 illustrates the second process 200 of automatically receiving positional information in the component 50 from the rack 12 in accordance with an embodiment of the present invention. As is seen, process 200 begins by initializing the positional information in the component 50 to "UNKNOWN" in step 202. This step occurs when a component 50 is introduced to the system. In other words, the component 50 is new and has not received positional information. Once the component 50 is mounted in the rack 12 of the present invention, it is determined if the component 50 senses a signal from at least one LED 40, via step 204.

Once the component 50 senses the signal, e.g., it "sees" the LED 40 transmit the signal, the component 50 determines whether its positional information is "UNKNOWN" in step 206. If so, the component 50 will update its positional information to reflect the information conveyed in the signal via the LED 40 in step 210. On the other hand, if the component's 50 positional information is not determined to be "UNKNOWN" in step 206, the component 50 determines whether its positional information is the same as the information conveyed in the signal by the LED 40, via step 208. If the information is not the same, the component 50 will update its positional information to reflect the new information in step 210.

After the component 50 updates or confirms its positional information in steps 210 and 208, respectively, it is determined whether a condition exists in the component 50 to require communication of the positional information, via step 212. For example, as discussed above, the component 50 is capable of generating messages to alert the system administrator 18 of potential problems. In the alternative, the software management software application 16 can initiate a "call" to the components 50 via the system management agent to report respective positional information. If such a condition exists, the component 50 generates a message including the positional information and transmits the message, via step 214. Thereafter, the process loops back to step 204.

As is shown in FIGS. 4 and 5, the two processes 100 and 200 are continuous and operate simultaneously. Because the microprocesser 20 directs the LEDs 40 to transmit their positional information continuously in process 100, a component 50 can be added to, or moved within, the rack 12 at any time, and be informed of its positional information within seconds. Also, because process 200 is continuous, the component 50 is regularly updating its positional information to reflect its current physical location within a rack 12. Accordingly, the system administrator 18 has access to reliable, accurate, and up-to-the-minute information regarding the physical location of the equipment 50.

Figure 6:
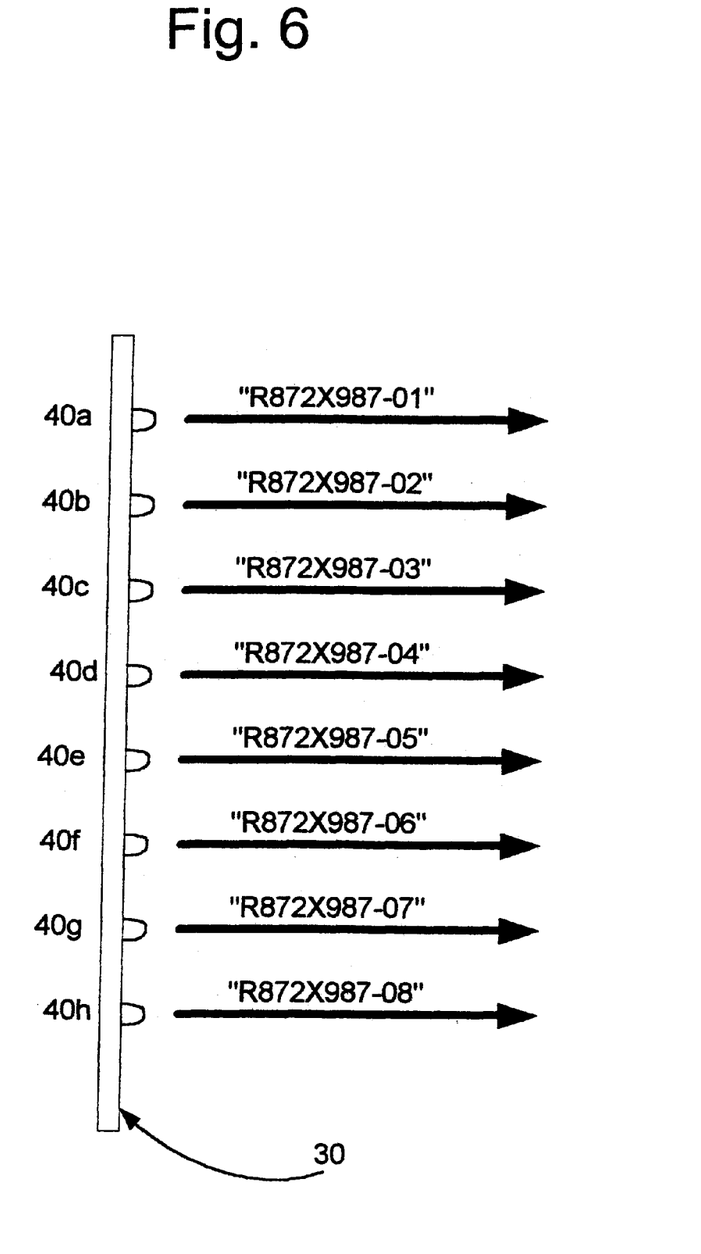
FIG. 6 illustrates an example of signals emitted from the signal emitting elements mounted on a strip in accordance to a preferred embodiment of the present invention.

Referring now to FIG. 6, an example of the signals emitted from the LEDs 40 is provided. The positional information transmitted by each LED 40 preferably identifies the rack 12 and the vertical position of the LED 40 in the strip 30. The rack 12 is identified by the microcontroller 20, which in one embodiment is assigned a unique identification number preferably at the time the device is manufactured. The vertical position of the LED 40 can be a number giving its relative position from the top or bottom of the strip 30. Thus, for example, in FIG. 6, the signal transmitted by each LED 40 contains the identification number assigned to the microcontroller 20 ("R872X987") followed by a number representing the relative vertical position of each LED 40 in the strip 30. The microcontroller 20 (not shown in FIG. 4) drives LED 40a to transmit R872X987-01, LED 40b to transmit R872X987-02, and so on until all LEDs 40 have transmitted their respective signals. Thus, each signal is unique to the LED 40, and each signal identifies the rack 12 and the vertical position in the rack 12. Any component 50 receiving this signal can communicate its location by rack 12 and vertical position therein.

In some cases, a component 50 in the rack 12 may "see" or receive the positional information transmitted from more than one LED 40. Here, the intelligent component 56 has the ability to collect the signals, and interpolate between the received signals to deduce an intermediate position. Thus, for example, let LEDs 40 be located at vertical positions 1, 3 and 5, but not positions 2 and 4, and let the component 50 be mounted at position 2. Assuming the component 50 senses the signals from LEDs 40 located at positions 1 and 3, the intelligent component 56 in the equipment 50 will determine that its vertical position is 2 by interpolating between the two signals. Accordingly, in this embodiment, fewer LEDs 40 are required without impairing performance.

According to the present invention, the rack 12 conveys positional information to the components 50 contained therein. In one embodiment, each component 50 is aware of the rack 12 in which it is contained and what position within the rack 12 it occupies. If the equipment 50 is in need of repair or intervention, the equipment 50 itself can initiate a trouble alert and provide its positional information automatically to the system administrator 18. Moreover, if the equipment 50 is moved to another location, the positional information in the equipment 50 is automatically updated to correspond to the new rack 12 and/or new position within the rack 12. Furthermore, the positional information from all equipment 50 in all racks 12 may be collected by the system management software application 16 to determine which equipment 50 is in the same rack 12 and where in the rack 12 each piece of equipment 50 is located. With this information, the system management software 16 can also create a graphical representation of equipment 50 in the rack 12 for the system administrator 18, who can then automatically locate the equipment 50 for upgrade or maintenance.

According to the present invention, the equipment 50 can be located automatically, i.e., without human intervention. Therefore, the system administrator 18 is not required to scan bar code numbers or enter data into a software application, thereby saving time and eliminating a source of mistakes. The present invention also does not require physical connections between the equipment 50 and the rack 12, thereby improving its reliability over other devices which utilize such cables and connectors. Finally, the main elements of the present invention, e.g., LEDs 40, microcontrollers 20, and phototransistors 54, are readily available commercially and very inexpensive. Thus, the present invention is low in cost and reliable.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for automatically determining the location of equipment mounted in a rack, the method comprising the steps of:

a) providing a plurality of signal emitting elements within the rack;

b) transmitting continuously and automatically positional information from the rack to the equipment via at least one signal emitting element of the plurality of signal emitting elements;

c) receiving the positional information in the equipment, and d) causing the equipment to be capable of reporting the positional information, such that the location of the equipment can be determined.

2. The method of claim 1, wherein transmitting step (b) further comprises the steps of:
   (b1) providing a microcontroller for driving the plurality of signal emitting elements, wherein the microcontroller is connected with the rack; and
   (b2) driving each element of the plurality of signal emitting elements, one at a time in sequential order, to transmit a signal comprised of positional information.

3. The method of claim 1, wherein receiving step (c) further comprises the steps of:
   (c1) sensing the positional information through a detector mounted in the equipment; and
   (c2) feeding the positional information sensed by the detector into a register, wherein an intelligent component in the equipment can read the positional information from the register.

4. The method of claim 3 further comprising the step of (e) providing the positional information to a system management software application.

5. The method of claim 4 wherein step (e) of providing the positional information further comprises the step of (e1) collecting the positional information from the equipment by the system management software application.

6. The method of claim 4 wherein step (e) of providing the positional information further comprises the step of (e1) reporting the positional information by the intelligent component to the system management software application.

7. The method of claim 2, wherein the plurality of signal emitting elements are located on an interior side wall of the rack and dispersed from a top to a bottom of the interior side wall.

8. The method of claim 7, wherein step (b1) of providing the microcontroller further comprises the step of (b1a) assigning an identification number to the microcontroller.

9. The method of claim 8, wherein the signal includes the microcontroller's identification number.

10. The method of claim 9, wherein the signal further includes information identifying a position of an element of the plurality of signal emitting elements relative to the top of the interior side wall of the rack.

11. The method of claim 9, wherein the signal further includes information identifying a position of an element of the plurality of signal emitting elements relative to the bottom of the interior side wall of the rack.

12. The method of claim 3, wherein step (c1) of sensing further includes the step of (c1a) providing an opening in the equipment through which the detector senses the positional information.

13. The method of claim 3, wherein receiving step c) further comprises the step of (c3) updating the positional information in the equipment if the positional information is different from the positional information conveyed in a previously received signal.

14. The method of claim 3, wherein the at least one signal emitting element is the signal emitting element closest to the detector in the equipment.

15. The method of claim 6 further comprising the step (f) of displaying a graphical image of the location of the equipment.

16. A system for automatically determining the location of equipment mounted in a rack, comprising:
   a plurality of signal emitting elements within the rack;
   a microcontroller for driving each signal emitting element of the plurality of signal emitting elements to transmit continuously and automatically, one at a time in sequential order, positional information;
   a receiver in the equipment for receiving the positional information transmitted by at least one signal emitting element, and
   an intelligent component in the equipment for reporting the positional information received by the receiver, such that the location of the equipment can be determined.

17. The system of claim 16 wherein the receiver further comprises:
   a detector mounted in the equipment for sensing the positional information; and
   a register into which the positional information is feed by the detector, wherein the intelligent component in the equipment reads the positional information from the register.

18. The system of claim 17 further comprising a system management software application for communicating with the equipment to determine the location of the equipment.

19. The system of claim 18, wherein the system management software application collects the positional information from the equipment.

20. The system of claim 18, wherein the equipment reports the positional information to the system management software application.

21. The system of claim 16, wherein the microcontroller is assigned an identification number.

22. The system of claim 21, wherein the positional information includes the microcontroller's identification number.

23. The system of claim 22, wherein the positional information further includes information identifying a position of a signal emitting element of the plurality of signal emitting elements relative to a top of the rack.

24. The system of claim 22, wherein the positional information further includes information identifying a position of a signal emitting element of the plurality of signal emitting elements relative to a bottom of the rack.

25. The system of claim 17, wherein the receiver further comprises:
   an opening in the equipment through which the detector senses the positional information.

26. The system of claim 17, wherein the intelligent component updates the positional information if the positional information is different from the positional information conveyed in a previously received signal.

27. The system of claim 17, wherein the at least one signal emitting element is the signal emitting element closest to the detector in the equipment.

28. The system of claim 20, wherein the system management software application displays a graphical image of the location of the equipment.

29. A method for automatically locating equipment stored in a rack, the method comprising the steps of:
   a) providing a strip, wherein the strip is mounted vertically on an interior side wall of the rack, the strip having a plurality of signal emitting elements;
   b) transmitting continuously and automatically positional information from the rack to the equipment via at least one signal emitting element of the plurality of signal emitting elements;
   c) receiving the positional information in the equipment, and
   d) causing the equipment to be capable of reporting the positional information, such that the location of the equipment can be determined.

30. The method of claim 29, wherein the transmitting step (b) further comprises the steps of:

(b1) providing a microcontroller for driving the plurality of signal emitting elements, wherein the microcontroller is connected with the strip; and (b2) driving each signal emitting element of the plurality of signal emitting elements, one at a time in sequential order, to transmit a signal comprised of positional information.

31. The method of claim 29, wherein the plurality of signal emitting elements comprises a plurality of light emitting diodes.

32. A system for automatically locating equipment stored in a rack, comprising:

a strip having a plurality of signal emitting elements, wherein the strip is mounted vertically on an interior side wall of the rack;

a microcontroller for driving each signal emitting element of the plurality of signal emitting elements to transmit continuously and automatically, one at a time in sequential order, positional information;

a receiver in the equipment for receiving the positional information transmitted by at least one signal emitting element; and an intelligent component in the equipment for reporting the positional information received by the receiver, such that the location of the equipment can be determined.

33. The system of claim 32, wherein the plurality of signal emitting elements comprises a plurality of light emitting diodes.

* * * * *